US012787066B2

(12) United States Patent
Agiwal

(10) Patent No.: US 12,787,066 B2
(45) Date of Patent: Nov. 3, 2026

(54) APPARATUS AND METHOD FOR RANDOM ACCESS AND SMALL DATA TRANSMISSION USING CONFIGURED RESOURCES IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 18/363,334

(22) Filed: Aug. 1, 2023

(65) Prior Publication Data

US 2024/0049296 A1 Feb. 8, 2024

(30) Foreign Application Priority Data

Aug. 2, 2022 (KR) ........................ 10-2022-0096388

(51) Int. Cl.
*H04W 74/0833* (2024.01)
*H04W 72/231* (2023.01)

(52) U.S. Cl.
CPC ..... *H04W 74/0833* (2013.01); *H04W 72/231* (2023.01)

(58) Field of Classification Search
None
See application file for complete search history.

(56) References Cited

U.S. PATENT DOCUMENTS

2021/0337625 A1 10/2021 Tsai et al.
2022/0039146 A1 2/2022 Lei et al.
2022/0039147 A1 2/2022 Lei et al.
(Continued)

FOREIGN PATENT DOCUMENTS

WO 2022/031980 A1 2/2022
WO 2022/111542 A1 6/2022
WO 2022/147817 A1 7/2022
(Continued)

OTHER PUBLICATIONS

International Search Report dated Nov. 22, 2023, issued in International Application No. PCT/KR2023/011224.
(Continued)

*Primary Examiner* — Gary Lafontant
(74) *Attorney, Agent, or Firm* — Jefferson IP Law, LLP

(57) ABSTRACT

The disclosure relates to a 5G or 6G communication system for supporting a higher data transmission rate. A method performed by a terminal in a wireless communication system is provided. The method includes transmitting, to a base station, a message A of a 2-step random access based on a configured grant small data transmission (CG-SDT) procedure, wherein the message A includes a cell radio network temporary identifier (C-RNTI) medium access control (MAC) control element (CE), and receiving, from the base station, a physical downlink control channel (PDCCH) addressed to the C-RNTI, wherein a random access response reception of the 2-step random access is completed, in case that the CG-SDT procedure is ongoing, a CG-SDT time alignment timer for the CG-SDT procedure is running and the PDCCH includes an uplink grant.

12 Claims, 5 Drawing Sheets

(56) References Cited

U.S. PATENT DOCUMENTS

2022/0272764 A1 8/2022 Agiwal et al.
2023/0371079 A1* 11/2023 Wang .................... H04W 72/00

FOREIGN PATENT DOCUMENTS

WO 2022/152189 A1 7/2022
WO WO-2022212706 A1 * 10/2022 ............ H04W 76/30

OTHER PUBLICATIONS

Huawei et al., Correction to MAC Spec for Small Data Transmission, R2-2206343, 3GPP TSG-RAN2#118 Meeting, May 27, 2022.
European Search Report dated Jul. 17, 2025, issued in European Patent Application No. 23850390.8.

* cited by examiner

APPARATUS AND METHOD FOR RANDOM ACCESS AND SMALL DATA TRANSMISSION USING CONFIGURED RESOURCES IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0096388, filed on Aug. 2, 2022, in the Korean Intellectual Property Office, the disclosure of each of which is incorporated by reference herein in its entirety.

BACKGROUND

1. Field

The disclosure relates to a wireless communication system (or a mobile communication system). More particularly, the disclosure relates to an apparatus, a method and a system for random access and small data transmission (SDT) using configured resources in wireless communication system (or, mobile communication system).

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

Recently, there are needs to enhance random access procedure and SDT procedure using configured resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

Additional aspects will be set forth in part in the description which follows and, in part, will be apparent from the description, or may be learned by practice of the presented embodiments.

In accordance with an aspect of the disclosure, a method performed by a terminal is provided. The method includes transmitting, to a base station, a message A of a 2-step random access based on a configured grant small data transmission (CG-SDT) procedure, wherein the message A includes a cell radio network temporary identifier (C-RNTI) medium access control (MAC) control element (CE), and receiving, from the base station, a physical downlink control channel (PDCCH) addressed to the C-RNTI, wherein a random access response reception of the 2-step random access is completed, in case that the CG-SDT procedure is ongoing, a CG-SDT time alignment timer for the CG-SDT procedure is running and the PDCCH includes an uplink grant.

In accordance with another aspect of the disclosure, a terminal is provided. The terminal includes a transceiver, and a controller coupled with the transceiver and configured to transmit, to a base station, a message A of a 2-step random access based on a configured grant small data transmission (CG-SDT) procedure, wherein the message A includes a cell radio network temporary identifier (C-RNTI) medium access control (MAC) control element (CE), and receive, from the base station, a physical downlink control channel (PDCCH) addressed to the C-RNTI, wherein a random access response reception of the 2-step random access is completed, in case that the CG-SDT procedure is ongoing, a CG-SDT time alignment timer for the CG-SDT procedure is running and the PDCCH includes an uplink grant.

In accordance with another aspect of the disclosure, a method performed by a base station is provided. The method includes receiving, from a terminal, a message A of a 2-step random access based on a configured grant small data transmission (CG-SDT) procedure, wherein the message A includes a cell radio network temporary identifier (C-RNTI) medium access control (MAC) control element (CE), and transmitting, to the terminal, a physical downlink control channel (PDCCH) addressed to the C-RNTI, wherein a random access response transmission of the 2-step random access is completed, in case that the CG-SDT procedure is ongoing, a CG-SDT time alignment timer for the CG-SDT procedure is running and the PDCCH includes an uplink grant.

In accordance with another aspect of the disclosure, a base station is provided. The base station includes a transceiver, and a controller coupled with the transceiver and configured to receive, from a terminal, a message A of a 2-step random access based on a configured grant small data transmission (CG-SDT) procedure, wherein the message A includes a cell radio network temporary identifier (C-RNTI) medium access control (MAC) control element (CE), and transmit, to the terminal, a physical downlink control channel (PDCCH) addressed to the C-RNTI, wherein a random access response transmission of the 2-step random access is completed, in case that the CG-SDT procedure is ongoing, a CG-SDT time alignment timer for the CG-SDT procedure is running and the PDCCH includes an uplink grant.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
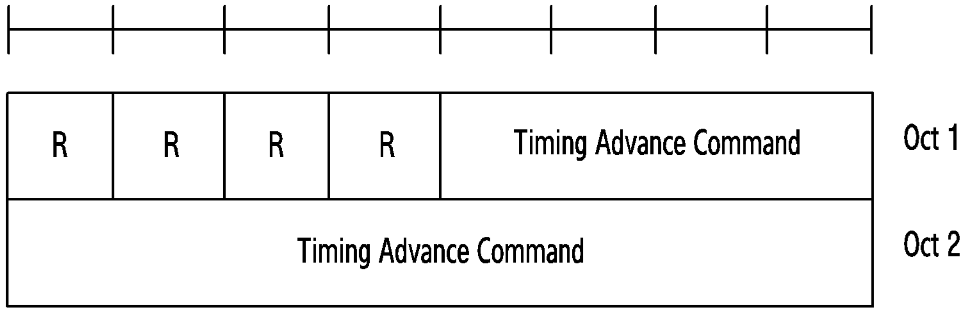
FIG. 1 illustrates an example of timing advance command medium access control (MAC) control element (CE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

By the term “substantially” it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, a fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc.

However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLLC) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of RX beam patterns of different directions. Each of these receive patterns can be also referred as RX beam.

Carrier Aggregation (CA)/Multi-connectivity in fifth generation wireless communication system: The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control (RRC) connected (RRC_CONNECTED) is configured to utilise radio resources provided by two distinct schedulers, located in two different nodes connected via a non-ideal backhaul and providing either Evolved Universal Mobile Telecommunications System (UMTS) Terrestrial Radio Access (E-UTRA) (i.e., if the node is an ng-eNB) or NR access (i.e., if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells (SCells). In NR the term Master Cell Group (MCG) refers to a group of serving cells associated with the Master Node, comprising of the primary cell (PCell) and optionally one or more SCells. In NR the term Secondary Cell Group (SCG) refers to a group of serving cells associated with the Secondary Node, comprising of the primary SCG cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the Reconfiguration with Sync procedure. For Dual Connectivity operation the term SpCell (i.e., Special Cell) refers to the PCell of the MCG or the PSCell of the SCG, otherwise the term Special Cell refers to the PCell.

PDCCH in fifth generation wireless communication system: In the fifth generation wireless communication system, Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid-ARQ information related to downlink shared channel (DL-SCH); Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y^*(\text{number of slots in a radio frame})+x-\text{Monitoring-offset-PDCCH-slot})\bmod(\text{Monitoring-periodicity-PDCCH-slot})=0; \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of CORESET configuration associated with it. A list of CORESET configurations are signalled by GNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of Transmission configuration indicator (TCI) states. One DL RS ID (synchronization signal block (SSB) or channel state information reference signal (CSI RS)) is configured per TCI state. The list of TCI states corresponding to a CORESET configuration is signalled by gNB via RRC signalling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first OFDM symbol of the PRACH occasion where UE has transmitted Msg1, i.e. RA preamble; $0 \le s\_id \le 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR medium access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC CE including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (SCell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e. gNB) within a configured window. The response is also referred as MsgB. Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e., upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g., in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e., gNB) within a configured window. The response is also referred as MsgB.

Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e., during random access resource selection for MsgA transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

- If this random access procedure is initiated by PDCCH order and if the ra-PreambleIndex explicitly provided by PDCCH is not 0b000000, UE selects 4 step RACH.
- else if 2 step contention free random access resources are signaled by gNB for this random access procedure, UE selects 2 step RACH.
- else if 4 step contention free random access resources are signaled by gNB for this random access procedure, UE selects 4 step RACH.
- else if the UL BWP selected for this random access procedure is configured with only 2 step RACH resources, UE selects 2 step RACH.
- else if the UL BWP selected for this random access procedure is configured with only 4 step RACH resources, UE selects 4 step RACH.
- else if the UL BWP selected for this random access procedure is configured with both 2 step and 4 step RACH resources,
  - if RSRP of the downlink pathloss reference is below a configured threshold, UE selects 4 step RACH. Otherwise UE selects 2 step RACH.

In the $5^{th}$ generation (also referred as NR or New Radio) wireless communication system UE can be in one of the following RRC state: RRC IDLE, RRC INACTIVE and RRC CONNECTED. The RRC states can further be characterized as follows:

In RRC_IDLE state, a UE specific DRX may be configured by upper layers (i.e. NAS). The UE, monitors Short Messages transmitted with P-RNTI over DCI; Monitors a Paging channel for CN paging using 5G-S-TMSI;—Performs neighbouring cell measurements and cell (re-)selection; Acquires system information and can send SI request (if configured).

In RRC_INACTIVE state, a UE specific DRX may be configured by upper layers or by RRC layer; In this state, UE stores the UE Inactive AS context. A RAN-based notification area is configured by RRC layer. The UE monitors Short Messages transmitted with P-RNTI over DCI; Monitors a Paging channel for CN paging using 5G-S-TMSI and RAN paging using full I-RNTI; Performs neighbouring cell measurements and cell (re-)selection; Performs RAN-based notification area updates periodically and when moving outside the configured RAN-based notification area; Acquires system information and can send SI request (if configured).

In the RRC_CONNECTED, the UE stores the AS context. Unicast data is transmitted/received to/from UE. At lower layers, the UE may be configured with a UE specific DRX. The UE, monitors Short Messages transmitted with P-RNTI over DCI, if configured; Monitors control channels associated with the shared data channel to determine if data is scheduled for it; Provides channel quality and feedback information; Performs neighbouring cell measurements and measurement reporting; Acquires system information.

The 5G or Next Generation Radio Access Network (NG-RAN) based on NR consists of NG-RAN nodes where NG-RAN node is a gNB, providing NR user plane and control plane protocol terminations towards the UE. The gNBs are also connected by means of the NG interfaces to the 5G core (5GC), more specifically to the Access and Mobility Management Function (AMF) by means of the NG-C interface and to the User Plane Function (UPF) by means of the NG-U interface. In the 5th generation (also referred as NR or New Radio) wireless communication system, the UE may use Discontinuous Reception (DRX) in RRC_IDLE and RRC_INACTIVE state in order to reduce power consumption. In the RRC_IDLE/RRC_INACTIVE state UE wake ups at regular intervals (i.e., every DRX cycle) for short periods to receive paging, to receive SI update notification and to receive emergency notifications. Paging message is transmitted using PDSCH. PDCCH is addressed to P-RNTI if there is a paging message in PDSCH. P-RNTI is common for all UEs. UE identity (i.e., S-TMSI for RRC_IDLE UE or I-RNTI for RRC_INACTIVE UE) is included in paging message to indicate paging for a specific UE. Paging message may include multiple UE identities to page multiple UEs. Paging message is broadcasted (i.e., PDCCH is masked with P-RNTI) over data channel (i.e., PDSCH). SI update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more POs to receive SI update notification and to receive emergency notifications. In RRC connected state, UE can monitor any PO in paging DRX cycle and monitors at least one PO in SI modification period. In the RRC idle/inactive mode UE monitors PO every DRX cycle in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. UE first determines the paging frame (PF) and then determines the PO with respect to the determined PF. One PF is a radio frame (10 ms).

Small data transmission in fifth generation wireless communication system: Small Data Transmission (SDT) is a procedure allowing data and/or signalling transmission while remaining in RRC_INACTIVE state (i.e., without transitioning to RRC_CONNECTED state). SDT is enabled on a radio bearer basis and is initiated by the UE only if less than a configured amount of UL data awaits transmission across all radio bearers for which SDT is enabled, the DL RSRP is above a configured threshold, and a valid SDT resource is available.

SDT procedure is initiated with either a transmission over RACH (configured via system information) or over Type 1 configured grant (CG) resources (configured via dedicated signaling in RRCRelease). The SDT resources can be configured on initial BWP for both RACH and CG. RACH and CG resources for SDT can be configured on either or both of NUL and SUL carriers. The CG resources for SDT are valid only within the cell the UE received RRCRelease and transitioned to RRC_INACTIVE state. For RACH, the network can configure 2-step and/or 4-step RA resources for SDT. When both 2-step and 4-step RA resources for SDT are configured, the UE selects the RA type. CFRA is not supported for SDT over RACH.

Once initiated, the SDT procedure is either:

- successfully completed after the UE is directed to RRC_IDLE (via RRCRelease) or RRC_INACTIVE (via RRCRelease or RRCReject) or to RRC_CONNECTED (via RRCResume or RRCSetup); or
- unsuccessfully completed upon cell re-selection, expiry of the SDT failure detection timer (also referred as T319a), a MAC entity reaching a configured maximum PRACH preamble transmission threshold, an RLC entity reaching a configured maximum retransmission threshold, or expiry of SDT-specific timing alignment timer while SDT procedure is ongoing over CG and the UE has not received a response from the network after the initial PUSCH transmission.

Upon unsuccessful completion of the SDT procedure, the UE transitions to RRC_IDLE.

The initial PUSCH transmission during the SDT procedure includes at least the CCCH message. After the SDT procedure is initiated, UE starts SDT failure detection timer (also referred as T319a) when UE first transmits the MAC PDU including the CCCH message. When using CG resources for initial SDT transmission, the UE can perform autonomous retransmission of the initial transmission if the UE does not receive confirmation from the network (dynamic UL grant or DL assignment) before a configured timer expires. After the initial PUSCH transmission, subsequent transmissions are handled differently depending on the type of resource used to initiate the SDT procedure:

- When using CG resources, the network can schedule subsequent UL transmissions using dynamic grants or they can take place on the following CG resource occasions. The DL transmissions are scheduled using dynamic assignments. The UE can initiate subsequent UL transmission only after reception of confirmation (dynamic UL grant or DL assignment) for the initial PUSCH transmission from the network. For subsequent UL transmission, the UE cannot initiate re-transmission over a CG resource.
- When using RACH resources, the network can schedule subsequent UL and DL transmissions using dynamic UL grants and DL assignments, respectively, after the completion of the RA procedure.

While the SDT procedure is ongoing, if data appears in a buffer of any radio bearer not enabled for SDT, the UE initiates a transmission of a non-SDT data arrival indication using UEAssistanceInformation message to the network and, if available, includes the resume cause.

SDT procedure over CG resources can only be initiated with valid UL timing alignment. The UL timing alignment is maintained by the UE based on a SDT-specific timing alignment timer configured by the network via dedicated signalling and, for initial CG-SDT transmission, also by DL RSRP of configured number of highest ranked SSBs which are above a configured RSRP threshold. Upon expiry of the SDT-specific timing alignment timer (cg-SDT-TimeAlignmentTimer), the CG resources are released while maintaining the CG resource configuration.

Logical channel restrictions configured by the network while in RRC_CONNECTED state and/or in RRCRelease message for radio bearers enabled for SDT, if any, are applied by the UE during SDT procedure.

The network may configure UE to apply ROHC continuity for SDT either when the UE initiates SDT in the cell where the UE received RRCRelease and transitioned to RRC_INACTIVE state or when the UE initiates SDT in a cell of its RNA.

Meanwhile, for a UE in RRC_INACTIVE state, CG-SDT procedure is initiated. When CG-SDT procedure is initiated, Cg-SDT-TimeAlignmentTimer is running, TimeAlignmentTimer is not running UE has received network response for initial CG-SDT transmission including CCCH message. UE initiate RA procedure (e.g., if there is no valid CG resource and/or UL data is available for transmission). For the initiated RA procedure, criteria to select 2 step RA is met. During the 2 step RA procedure, UE transmits C-RNTI MAC CE in MsgA. UE monitors PDCCH addressed to MsgB-RNTI and C-RNTI. In this scenario, the issue is that in order to declare random access response is successfully received and random access procedure is successfully completed, none of the existing criteria defined for the case C-RNTI MAC CE is include in MsgA, can be met. As a result, random access procedure cannot be completed; UE will unnecessarily keep retransmitting MsgA and ultimately random access procedure failure will be declared and UE will enter RRC_IDLE state

Embodiment 1

FIG. 1 illustrates an example of timing advance command medium access control (MAC) control element (CE) according to an embodiment of the disclosure.

Figure 2A:
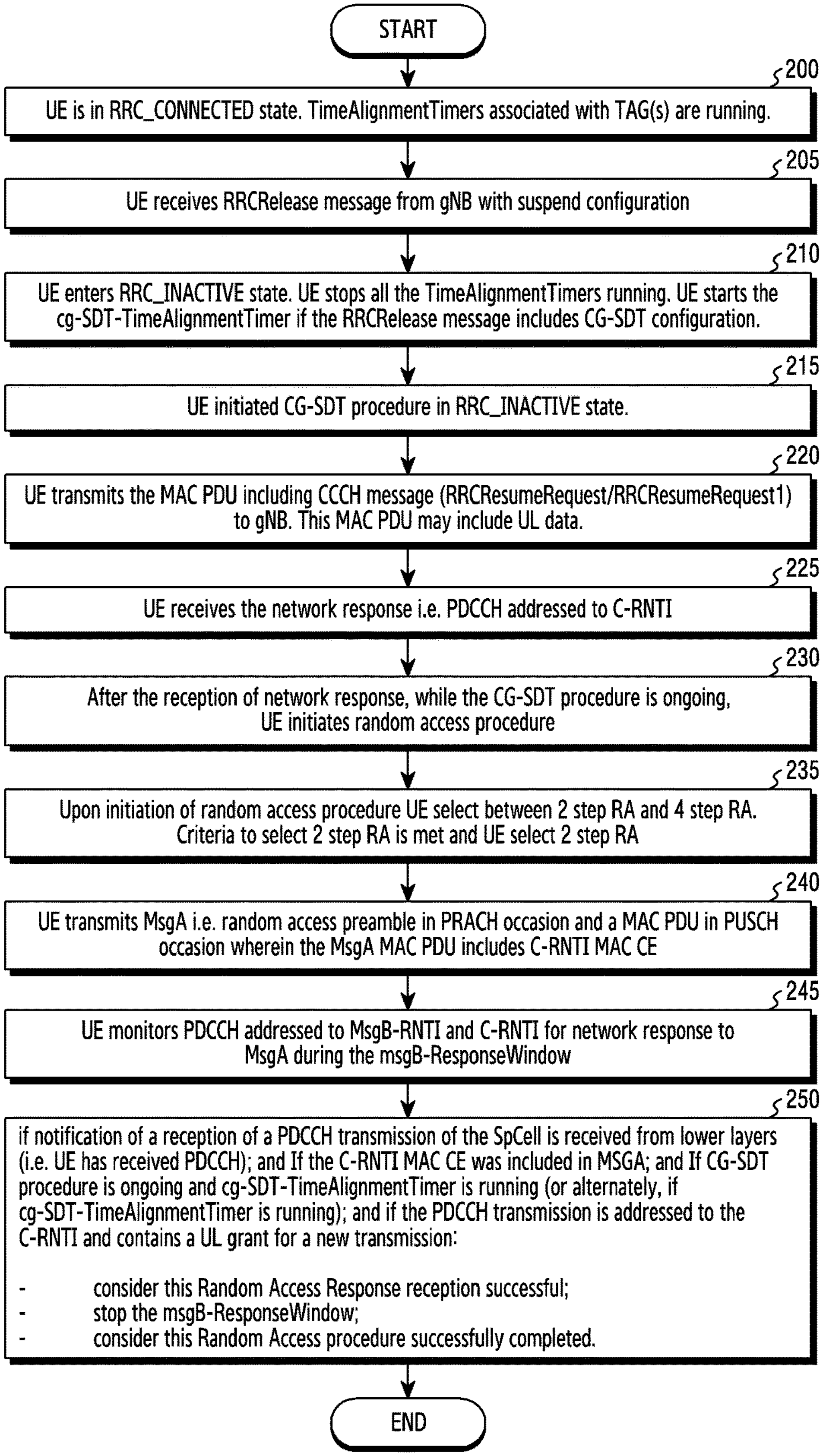
FIG. 2A illustrates a flow chart of random access procedure associated with configured grant (CG) SDT procedure according to an embodiment of the disclosure.

FIG. 2A illustrates a flow chart of random access procedure associated with configured grant (CG) SDT procedure according to an embodiment of the disclosure.

Figure 2B:
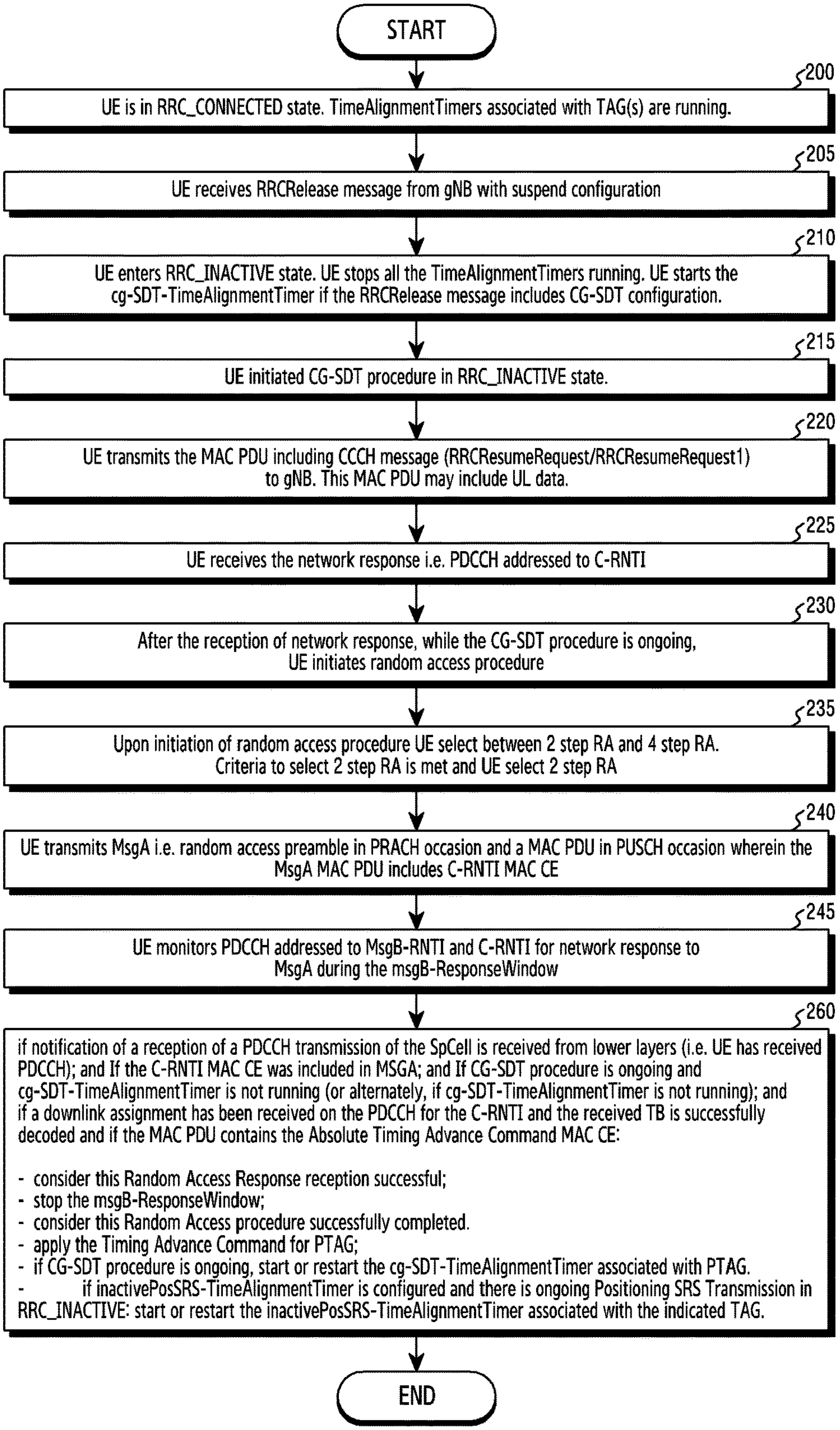
FIG. 2B illustrates a flow chart of random access procedure associated with configured grant (CG) SDT procedure according to an embodiment of the disclosure.

FIG. 2B illustrates a flow chart of random access procedure associated with configured grant (CG) SDT procedure according to an embodiment of the disclosure.

Referring to FIGS. 2A and 2B, in an embodiment of this disclosure, operation is as follows as well:

At operation 200, UE is in RRC_CONNECTED state. In the RRC_CONNECTED state, one or more serving cell(s) can be configured. Serving cell(s) are grouped in one or more timing advanced groups (TAGs). UE maintains separate UL timing for each TAG. TimeAlignmentTimer is maintained per TAG. The value of TimeAlignmentTimer for each TAG is signaled by gNB in RRCReconfiguration message. At the time of connection setup/resume the value of TimeAlignmentTimer signaled in system information is used.

At operation 205, While the UE is in RRC_CONNECTED state, UE receives RRCRelease message from gNB with suspend configuration. RRCRelease message indicates or includes configuration of CG resources for SDT. RRCRelease message indicates or includes cg-SDT-TimeAlignmentTimer value.

At operation 210, UE enters RRC_INACTIVE state upon receiving RRCRelease message with suspend configuration. UE stops all the TimeAlignmentTimers running upon transition from RRC_CONNECTED to RRC_INACTIVE. UE starts the cg-SDT-TimeAlignmentTimer upon transition from RRC_CONNECTED to RRC_INACTIVE if the RRCRelease message includes CG-SDT configuration or configuration of CG resources for SDT. The value of this timer is received in RRCRelease message.

At operation 215, While in RRC_INACTIVE state, upon arrival of data for one or more SDT RB(s), SDT criteria (DL reference signal received power (RSRP) of cell is above RSRP threshold, data available for SDT RB(s) is below the data volume threshold, etc.) is met and criteria to initiate CG-SDT is met, UE initiates CG-SDT procedure. UE initiate CG-SDT only if cell is not changed (i.e., UE is in same cell from which UE has last received RRC Release message) and cg-SDT-TimeAlignmentTimer is running and CG resources for SDT are configured and at least one SSB associated with CG resources is above a configured threshold.

At operation 220, Upon initiation of SDT procedure, UE first transmits the MAC PDU including CCCH message (RRCResumeRequest/RRCResumeRequest1) to gNB. This MAC PDU may include UL data. When the MAC PDU including the CCCH message is first transmitted by MAC entity in the UE, UE starts SDT error detection timer or T319a. Note that the SDT timer/SDT error detection timer/T319a is different from cg-SDT-TimeAlignmentTimer.

At operation 225, Upon transmitting the MAC PDU including CCCH message (RRCResumeRequest/RRCResumeRequest1) to gNB, UE receives the network response i.e., PDCCH addressed to C-RNTI.

At operation 230, After the reception of network response, while the CG-SDT procedure is ongoing, UE initiates random access procedure if there is no valid CG resource available (i.e., SS-RSRP of all SSBs for which CG-resources are configured is below threshold). Alternately, after the reception of network response, while the CG-SDT procedure is ongoing, if cg-SDT-TimeAlignmentTimer expires, UE suspends UL transmission except RA preamble and MsgA, UE may initiate random access procedure upon UL data arrival.

At operation 235, Upon initiation of random access procedure UE select between 2 step RA and 4 step RA. Criteria to select 2 step RA is met and UE select 2 step RA.

At operation 240, During the 2 step RA procedure, UE transmits MsgA i.e., random access preamble in PRACH occasion and a MAC PDU in PUSCH occasion wherein the MsgA MAC PDU includes C-RNTI MAC CE.

At operation 245, Upon transmitting the MsgA MAC PDU UE monitors PDCCH addressed to MsgB-RNTI and C-RNTI for network response to MsgA during the msgB-ResponseWindow.

At operation 250 in FIG. 2A, In an embodiment, if notification of a reception of a PDCCH transmission of the SpCell is received from lower layers (i.e., UE has received PDCCH); and If the C-RNTI MAC CE was included in MSGA; and If CG-SDT procedure is ongoing and cg-SDT-TimeAlignmentTimer is running (or alternately, if cg-SDT-TimeAlignmentTimer is running);

and if the PDCCH transmission is addressed to the C-RNTI and contains a UL grant for a new transmission:

consider this Random Access Response reception successful;

stop the msgB-ResponseWindow;

consider this Random Access procedure successfully completed.

In an embodiment, if notification of a reception of a PDCCH transmission of the SpCell is received from lower layers; and If the C-RNTI MAC CE was included in MSGA; and If CG-SDT procedure is not ongoing and TimeAlignmentTimer is running;

and if the PDCCH transmission is addressed to the C-RNTI and contains a UL grant for a new transmission:

consider this Random Access Response reception successful;

stop the msgB-ResponseWindow;

consider this Random Access procedure successfully completed.

Alternate At operation 260 in FIG. 2B, In an embodiment, if notification of a reception of a PDCCH transmission of the SpCell is received from lower layers (i.e. UE has received PDCCH); and If the C-RNTI MAC CE was included in MSGA; and If CG-SDT procedure is ongoing and cg-SDT-TimeAlignmentTimer is not running (or alternately, if cg-SDT-TimeAlignmentTimer is not running); and if a downlink assignment has been received on the PDCCH for the C-RNTI and the received TB is successfully decoded and if the MAC PDU contains the Absolute Timing Advance Command MAC CE:

consider this Random Access Response reception successful;

stop the msgB-ResponseWindow;

consider this Random Access procedure successfully completed and finish the disassembly and demultiplexing of the MAC PDU.

when an Absolute Timing Advance Command MAC CE is received in response to a MSGA transmission including C-RNTI MAC CE:

apply the Timing Advance Command for PTAG;

if CG-SDT procedure is ongoing, start or restart the cg-SDT-TimeAlignmentTimer associated with PTAG.

if inactivePosSRS-TimeAlignmentTimer is configured and there is ongoing Positioning SRS Transmission in RRC_INACTIVE: start or restart the inactivePosSRS-TimeAlignmentTimer associated with the indicated TAG.

inactivePosSRS-TimeAlignmentTimer can be configured in system information or RRCRelease or RRCReconfiguration message.

Referring to FIG. 1, the Absolute Timing Advance Command MAC CE is identified by MAC subheader with extended logical channel identifier (eLCID). It has a fixed size and consists of two octets. Timing Advance Command field in MAC CE indicates the index value X used to control the amount of timing adjustment that the MAC entity has to apply. The size of the field is 12 bits; $N_{TA}=(X*16*64)/2^{U}$, where U is SCS index.

Note that Absolute Timing Advance Command MAC CE is different from the Timing Advance Command MAC CE. Absolute Timing Advance Command MAC CE is received during the 2 step RA procedure. Timing Advance Command MAC CE can be transmitted by gNB except during RA procedure. Timing Advance Command MAC CE is identified by MAC subheader with LCID.

It has a fixed size and consists of a single octet. TAG Identity (TAG ID) in Timing Advance Command MAC CE indicates the TAG Identity of the addressed TAG. The TAG containing the SpCell has the TAG Identity 0. The length of the field is 2 bits; Timing Advance Command: This field indicates the index value $T_A$ (0, 1, 2, . . . 63) used to control the amount of timing adjustment that MAC entity has to apply. The length of the field is 6 bits. $N_{TA}=N_{TA}+[(T_A-31)*16*64]/2^U$, where U is SCS index.

Criteria for selecting CG-SDT: CG-SDT criteria is considered met, if all of the following conditions are met, 1) available data volume<=data volume threshold (data volume threshold is signaled by gNB and can be specific to CG-SDT or common for CG-SDT and RA-SDT)
2) RSRP (cell quality or RSRP of path loss reference) is greater than or equal to a configured threshold (threshold is signaled by gNB and can be specific to CG-SDT or common for CG-SDT and RA-SDT)
3) CG-SDT resources are configured on the selected UL carrier and are valid (e.g., TA is valid (TAT-SDT timer is running), UE's cell is same as the cell from which CG resources are received)
   - Selected carrier is the NUL if SUL is not configured in the cell.
   - Selected carrier is the NUL if SUL is configured in the cell but CG resources for SDT are not configured for SUL
   - Selected carrier is the NUL if SUL is configured in the cell and RSRP is greater than a threshold (threshold is signaled by gNB)
   - Selected carrier is the SUL if SUL is configured in the cell and RSRP is not greater than a threshold (threshold is signaled by gNB)
   - Selected carrier is the SUL if SUL is configured in the cell but CG resources for SDT are not configured for NUL
   - For each UL transmission if CG resource is available in time first for SUL, SUL is selected for that UL transmission. If CG resource is available in time first for NUL, NUL is selected for that UL transmission Embodiment 2

In an embodiment of this disclosure, operation is as follows:

Step 0: UE initiates random access procedure.

Step 1: Upon initiation of random access procedure UE select between 2 step RA and 4 step RA. Criteria to select 2 step RA is met and UE select 2 step RA.

Step 2: During the 2 step RA procedure, UE transmits MsgA i.e., random access preamble in PRACH occasion and a MAC PDU in PUSCH occasion wherein the MsgA MAC PDU includes C-RNTI MAC CE.

Step 3: Upon transmitting the MsgA MAC PDU UE monitors PDCCH addressed to MsgB-RNTI and C-RNTI for network response to MsgA during the msgB-ResponseWindow.

Step 4: If notification of a reception of a PDCCH transmission of the SpCell is received from lower layers (i.e., UE has received PDCCH) and if the C-RNTI MAC CE was included in MSGA, UE performs the following:

3> if the Random Access procedure was initiated for SpCell beam failure recovery or for beam failure recovery of both BFD-RS sets of SpCell and the PDCCH transmission is addressed to the C-RNTI:

4> consider this Random Access Response reception successful;

4> stop the msgB-ResponseWindow;

4> consider this Random Access procedure successfully completed.

3> else if the timeAlignmentTimer associated with the PTAG is running:

4> if the PDCCH transmission is addressed to the C-RNTI and contains a UL grant for a new transmission:

5> consider this Random Access Response reception successful;

5> stop the msgB-ResponseWindow;

5> consider this Random Access procedure successfully completed.

3> else if CG-SDT procedure is ongoing and cg-SDT-TimeAlignmentTimer is running (or cg-SDT-Time-AlignmentTimer is running)

4> if the PDCCH transmission is addressed to the C-RNTI and contains a UL grant for a new transmission:

5> consider this Random Access Response reception successful;

5> stop the msgB-ResponseWindow;

5> consider this Random Access procedure successfully completed.

3> else (e.g. timeAlignmentTimer associated with the PTAG is not running or cg-SDT-TimeAlignment-Timer is not running):

4> if a downlink assignment has been received on the PDCCH for the C-RNTI and the received TB is successfully decoded:

5> if the MAC PDU contains the Absolute Timing Advance Command MAC CE:

6> process the received Timing Advance Command;

6> consider this Random Access Response reception successful;

6> stop the msgB-ResponseWindow;

6> consider this Random Access procedure successfully completed and finish the disassembly and demultiplexing of the MAC PDU.

6> when an Absolute Timing Advance Command MAC CE is received in response to a MSGA transmission including C-RNTI MAC CE:

7> apply the Timing Advance Command for PTAG;

7> if CG-SDT procedure is ongoing, start or restart the cg-SDT-TimeAlignmentTimer associated with PTAG.

7> if inactivePosSRS-TimeAlignmentTimer is configured and there is ongoing Positioning SRS Transmission in RRC_INACTIVE: start or restart the inactivePosSRS-TimeAlignment-Timer associated with the indicated TAG. inactivePosSRS-TimeAlignmentTimer can be configured in system information or RRCRelease or RRCReconfiguration message.

Embodiment 3—Downlink Positioning Reference Signal (DL-PRS) Processing Window (DL-PPW)

Each BWP has its own list of PPWs (configured in BWP-DownlinkDedicated→dl-PPW-PreConfigToAddModList-r17 in RRCReconfiguration message). When PPW is activated and PRS has higher priority than DL channel and signals, for the affected symbols within the PPW, the MAC entity shall:

1> if the ra-ResponseWindow or the ra-ContentionResolutionTimer or the msgB-ResponseWindow is running:
  2> monitor the PDCCH as specified in clauses 5.1.4 and 5.1.5 of TS 38.321.
1> else:
  2> not receive DL-SCH;
  2> not receive PDCCH.

In an embodiment of this disclosure, if PPWs are configured for activated DL BWP Y of a serving cell, UE implicitly activates PPW with PPW ID 'N', if the PPW ID 'N' was active for last active DL BWP of the serving cell before the activation of DL BWP Y. If there is no PPW with PPW ID 'N' amongst the list of PPWs configured for activated DL BWP Y, none of the PPWs are considered active.

For Example:

1. UE's active DL BWP is DL BWP X for serving cell A.
2. UE receives activation command (PPW Activation/Deactivation Command MAC CE) activating PPW with PPW ID 'N' for serving cell A.
3. UE activates PPW with PPWID 'N' for DL BWP X of serving cell A.
4. UE receives BWP switching command to switch active DL BWP to BWP Y for serving cell A.
5. UE's active BWP is switched to DL BWP Y for serving cell A. DL BWP X is deactivated.
6. PPW with PPWID 'N' for DL BWP Y of serving cell A is considered active.

In an embodiment of this disclosure, if PPWs are configured for an activated DL BWP of a serving cell, none of the PPWs are considered active at the time the DL BWP is activated. When a BWP is activated, all the PPWs configured on the BWP are considered deactivated.

For another Example:

1. UE's active DL BWP is DL BWP X for serving cell A.
2. UE receives activation command (PPW Activation/Deactivation Command MAC CE) activating PPW with PPW ID 'N' for serving cell A.
3. UE activates PPW with PPWID 'N' for DL BWP X of serving cell A.
4. UE receives BWP switching command to switch active DL BWP to BWP Y for serving cell A.
5. UE's active BWP is switched to DL BWP Y for serving cell A. DL BWP X is deactivated.
6. All PPWs (if configured) of DL BWP Y of serving cell A are considered not active. All PPWs of DL BWP X of serving cell A are considered not active. UE waits for activation command.

In an embodiment of this disclosure, upon reconfiguration of PPW(s) of the active DL BWP, all the PPW(s) for that BWP are considered deactivated.

UE's active DL BWP is BWP X for serving cell A.
  UE receives activation command (PPW Activation/Deactivation Command MAC CE) activating PPW with PPW ID 'N' for serving cell A.
UE activates PPW with PPWID 'N' for BWP X of serving cell A.
  UE receives RRCReconfiguration message with updated dl-PPW-PreConfigToAddModList-r17 for BWP X.
UE considers all the PPW(s) for BWP X as deactivated.
  UE waits for activation command.

In an embodiment of this disclosure, upon reconfiguration of PPW(s) of the active DL BWP, if the PPW which is active before receiving the reconfiguration is present in the list after reconfiguration, UE consider that PPW as active.

UE's active DL BWP is BWP X for serving cell A.
  UE receives activation command (PPW Activation/Deactivation Command MAC CE) activating PPW with PPW ID 'N' for serving cell A.
UE activates PPW with PPWID 'N' for BWP X of serving cell A.
  UE receives RRCReconfiguration message with updated dl-PPW-PreConfigToAddModList-r17 for BWP X.
  If PPW with PPWID 'N' is present in updated dl-PPW-PreConfigToAddModList-r17, UE considers that PPW as still active.

Figure 3:
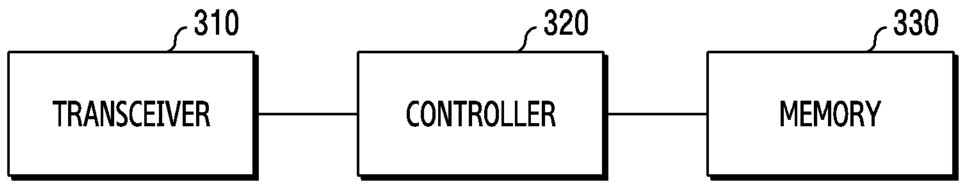
FIG. 3 is a block diagram of a terminal according to an embodiment of the disclosure.

FIG. 3 is a block diagram of a terminal according to an embodiment of the disclosure.

Referring to FIG. 3, a terminal includes a transceiver 310, a controller 320 and a memory 330. The controller 320 may refer to a circuitry, an application-specific integrated circuit (ASIC), or at least one processor. The transceiver 310, the controller 320 and the memory 330 are configured to perform the operations of the UE illustrated in the figures, e.g., FIGS. 1, 2A, and 2B, or described above. Although the transceiver 310, the controller 320 and the memory 330 are shown as separate entities, they may be realized as a single entity like a single chip. Or, the transceiver 310, the controller 320 and the memory 330 may be electrically connected to or coupled with each other.

The transceiver 310 may transmit and receive signals to and from other network entities, e.g., a base station. The controller 320 may control the UE to perform functions according to one of the embodiments described above.

In an embodiment, the operations of the terminal may be implemented using the memory 330 storing corresponding program codes. Specifically, the terminal may be equipped with the memory 330 to store program codes implementing desired operations. To perform the desired operations, the controller 320 may read and execute the program codes stored in the memory 330 by using a processor or a central processing unit (CPU).

Figure 4:
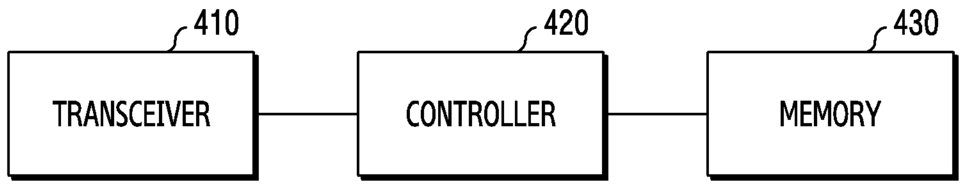
FIG. 4 is a block diagram of a base station according to an embodiment of the disclosure.

FIG. 4 is a block diagram of a base station according to an embodiment of the disclosure.

Referring to FIG. 4, a base station includes a transceiver 410, a controller 420 and a memory 430. The controller 420 may refer to a circuitry, an ASIC, or at least one processor. The transceiver 410, the controller 420 and the memory 430 are configured to perform the operations of the network (e.g., gNB) illustrated in the figures, e.g., FIGS. 1, 2A, and 2B, or described above. Although the transceiver 410, the controller 420 and the memory 430 are shown as separate entities, they may be realized as a single entity like a single chip. The transceiver 410, the controller 420 and the memory 430 may be electrically connected to or coupled with each other.

The transceiver 410 may transmit and receive signals to and from other network entities, e.g., a terminal. The controller 420 may control the base station to perform functions according to one of the embodiments described above.

In an embodiment, the operations of the base station may be implemented using the memory 430 storing corresponding program codes. Specifically, the base station may be equipped with the memory 430 to store program codes implementing desired operations. To perform the desired operations, the controller 420 may read and execute the program codes stored in the memory 430 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

initiating, while the UE is in a radio resource control (RRC) inactive state, a configured grant small data transmission (CG-SDT) procedure;

transmitting, to a base station, an initial CG-SDT transmission including a common control channel (CCCH) message;

receiving. from the base station, a response for the initial CG-SDT transmission;

initiating a 2-step random access based on the response, if a CG resource is not valid;

transmitting, to the base station, a message A of the 2-step random access, wherein the message A includes a cell radio network temporary identifier (C-RNTI) medium access control (MAC) control element (CE);

receiving, from the base station, a physical downlink control channel (PDCCH) addressed to the C-RNTI during the 2-step random access;

if the CG-SDT procedure is ongoing, a CG-SDT time alignment timer (TAT) for the CG-SDT procedure is running, and the PDCCH addressed to the C-RNTI includes an uplink grant for a new transmission, identifying that a random access response (RAR) reception is successful, stopping a message B response window, and identifying that the 2-step random access is successfully completed; and if the CG-SDT procedure is ongoing, the CG-SDT TAT is not running, a downlink assignment has been received on the PDCCH for the C-RNTI, and a received MAC protocol data unit (PDU) according to the PDCCH for the C-RNTI includes an absolute timing advance command MAC CE, identifying that the RAR reception is successful, stopping the message B response window, identifying that the 2-step random access is successfully completed, and finishing a disassembly and demultiplexing of the MAC PDU.

2. The method of claim 1, further comprising:

starting or restarting the CG-SDT TAT associated with a primary timing advance group (PTAG), based on the absolute timing advance command MAC CE.

3. The method of claim 2, wherein a subheader of the absolute timing advance command MAC CE includes an extended logical channel identifier (eLCID).

4. A method performed by a base station in a wireless communication system, the method comprising:

receiving, from a user equipment (UE) in a radio resource control (RRC) inactive state, an initial configured grant small data transmission (CG-SDT) transmission including a common control channel (CCCH) message;

transmitting, to the UE, a response for the initial CG-SDT transmission, wherein the response initiates a 2-step random access, if a CG resource is not valid;

receiving, from the UE, a message A of the 2-step random access, wherein the message A includes a cell radio network temporary identifier (C-RNTI) medium access control (MAC) control element (CE); and transmitting, to the UE, a physical downlink control channel (PDCCH) addressed to the C-RNTI during the 2-step random access, wherein, if the CG-SDT procedure is ongoing, a CG-SDT time alignment timer (TAT) for the CG-SDT procedure is running, and the PDCCH addressed to the C-RNTI includes an uplink grant for a new transmission, a random access response (RAR) transmission is successful, a message B response window is stopped, and the 2-step random access is successfully completed, and wherein, if the CG-SDT procedure is ongoing, the CG-SDT TAT is not running, a downlink assignment has been transmitted on the PDCCH for the C-RNTI, and a transmitted MAC protocol data unit (PDU) according to the PDCCH for the C-RNTI includes an absolute timing advance command MAC CE, the RAR transmission is successful, the message B response window is stopped, the 2-step random access is successfully completed, and a disassembly and demultiplexing of the MAC PDU is finished.

5. The method of claim 4, wherein the CG-SDT TAT associated with a primary timing advance group (PTAG) is started or restarted based on the absolute timing advance MAC CE.

6. The method of claim 5, wherein a subheader of the absolute timing advance command MAC CE includes an extended logical channel identifier (eLCID).

7. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

initiate, while the UE is in a radio resource control (RRC) inactive state. a configured grant small data transmission (CG-SDT) procedure, transmit, to a base station, an initial CG-SDT transmission including a common control channel (CCCH) message, receive, from the base station, a response for the initial CG-SDT transmission, initiate a 2-step random access based on the response, if a CG resource is not valid.

transmit, to the base station, a message A of the 2-step random access, wherein the message A includes a cell radio network temporary identifier (C-RNTI) medium access control (MAC) control element (CE), receive, from the base station, a physical downlink control channel (PDCCH) addressed to the C-RNTI during the 2-step random access, if the CG-SDT procedure is ongoing, a CG-SDT time alignment timer (TAT) for the CG-SDT procedure is running, and the PDCCH addressed to the C-RNTI includes an uplink grant for a new transmission, identify that a random access response (RAR) reception is successful, stop a message B response window, and identify that the 2-step random access is successfully completed, and if the CG-SDT procedure is ongoing, the CG-SDT TAT is not running, a downlink assignment has been received on the PDCCH for the C-RNTI, and a received MAC protocol data unit (PDU) according to the PDCCH for the C-RNTI includes an absolute timing advance command MAC CE, identify that the RAR reception is successful, stop the message B response window, identify that the 2-step random access is successfully completed, and finish a disassembly and demultiplexing of the MAC PDU.

8. The UE of claim 7, wherein the instructions further cause the UE to:

start or restart the CG-SDT TAT associated with a primary timing advance group (PTAG), based on the absolute timing advance command MAC CE.

9. The UE of claim 8, wherein a subheader of the absolute timing advance command MAC CE includes an extended logical channel identifier (eLCID).

10. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

receive, from a user equipment (UE) in a radio resource control (RRC) inactive state, an initial configured grant small data transmission (CG-SDT) transmission including a common control channel (CCCH) message, transmit, to the UE, a response for the initial CG-SDT transmission, wherein the response initiates a 2-step random access, if a CG resource is not valid, receive, from a user equipment (UE) the UE, a message A of a the 2-step random access-based on a configured grant small data transmission (CG SDT) procedure, wherein the message A includes a cell radio network temporary identifier (C-RNTI) medium access control (MAC) control element (CE), and transmit, to the UE, a physical downlink control channel (PDCCH) addressed to the C-RNTI during the 2-step random access, wherein, if the CG-SDT procedure is ongoing, a CG-SDT time alignment timer (TAT) for the CG-SDT procedure is running, and the PDCCH addressed to the C-RNTI includes an uplink grant for a new transmission, a random access response (RAR) transmission is successful, a message B response window is stopped, and the 2-step random access-are successful is successfully completed, and wherein, if the CG-SDT procedure is ongoing, the CG-SDT TAT is not running, a downlink assignment has been transmitted on the PDCCH for the C-RNTI, and a transmitted MAC protocol data unit (PDU) according to the PDCCH for the C-RNTI includes an absolute timing advance command MAC CE, the RAR transmission is successful, the message B response window is stopped, and the 2-step random access are successful is successfully completed. and a disassembly and demultiplexing of the MAC PDU is finished.

11. The base station of claim 10, wherein the CG-SDT TAT associated with a primary timing advance group (PTAG) is started or restarted based on the absolute timing advance MAC CE.

12. The base station of claim 11, wherein a subheader of the absolute timing advance command MAC CE includes an extended logical channel identifier (eLCID).

* * * * *